N. TESTRUP, T. RIGBY & G. W. ANDREW.
GASIFICATION OF SEWAGE SLUDGE.
APPLICATION FILED JULY 11, 1914.

1,189,638.

Patented July 4, 1916.

WITNESSES
J. W. Harris
C. H. Potter

INVENTORS
Nils Testrup
BY Thomas Rigby
George William Andrew
Byrnes Townsend & Buckenstein
ATTORNEYS

UNITED STATES PATENT OFFICE.

NILS TESTRUP, OF LONDON, ENGLAND, AND THOMAS RIGBY AND GEORGE WILLIAM ANDREW, OF DUMFRIES, SCOTLAND, ASSIGNORS TO WETCARBONIZING LIMITED, OF LONDON, ENGLAND.

GASIFICATION OF SEWAGE-SLUDGE.

1,189,638.  Specification of Letters Patent.  Patented July 4, 1916.

Application filed July 11, 1914. Serial No. 850,513.

*To all whom it may concern:*

Be it known that we, NILS TESTRUP, a subject of the King of Great Britain and Ireland, and a resident of 3 Dean Farrar street, London, S. W., England, and THOMAS RIGBY and GEORGE WILLIAM ANDREW, both subjects of the King of Great Britain and Ireland, and residents of 61 Loreburn street, Dumfries, Scotland, have invented certain new and useful Gasification of Sewage-Sludge, of which the following is a specification.

This invention relates to the recovery of valuable products from sewage sludge such as nitrogen compounds (ammonia, pyridin, etc.) and grease by gasification of the material.

When sewage sludge has been reduced by any known process to a moderately dry condition its gasification is particularly advantageous since it not only can yield fuel gas but a large amount of the nitrogen which it often contains (some 3%–4% by weight of the dry solids). The gasification presents, however, considerable working difficulties and the fusible nature and large quantity of the ash (often some 50%) seriously affect the working of the producer and contribute to irregularity in and poor quality of the gas. We have ascertained that these difficulties are overcome to a great degree if the amount of air introduced into the fire in relation to the steam so introduced be substantially reduced and the consequent deficit in heat which arises from the reduction of the oxygen for combustion be made up from some external source.

According to the present invention therefore in effecting the gasification we use an amount of air in the blast insufficient to give rise to the difficulties referred to and obtain the necessary make-up heat from external sources, as by superheating the blast.

In its preferred form we subject the material to a degreasing distilling operation independent of and preliminary to the gasification proper.

Figure 1:
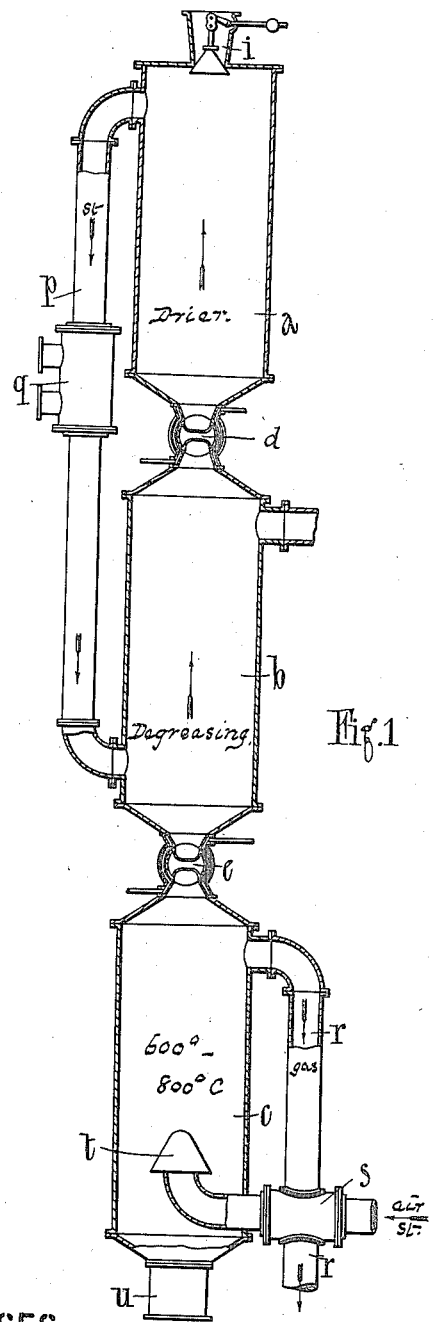
Figure 2:
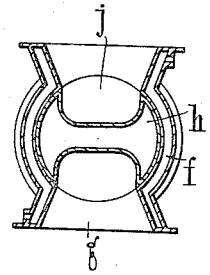
Figure 3:
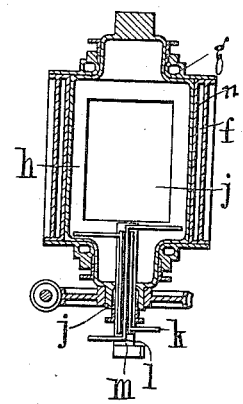

In the accompanying drawing showing diagrammatically one form of apparatus suitable for carrying out the invention, Figure 1 represents a side view thereof, partly in section; and Figs. 2 and 3 show details of the water-cooled valves, in sectional elevation and plan, respectively, and drawn to an enlarged scale.

In carrying out the process in apparatus of the type illustrated, three distinct steps, viz., drying, degreasing and decarbonization, are consecutively effected in zones $a$, $b$, and $c$, separated by water-cooled valves $d$ and $e$ in the same vertical retort. Such valves, as more clearly indicated in Figs. 2 and 3, are provided with a water circulating jacket $f$ in the stationary part $g$, and a jacket $h$ in the movable part $j$ of the valve, water being taken to and from the latter part by pipes $k$ and $l$ arranged within a stationary tube $m$, between which and the casing $n$ the part $j$ is angularly movable.

The charge of sewage sludge is admitted at the hopper $i$, and the steam evolved in the drying zone $a$, together with such additional steam as is necessary, passes by way of a pipe $p$ through a heater $q$ to the degreasing zone $b$, wherein distillation of a previous charge transferred from the drying zone is usually effected by the steam above mentioned superheated to a temperature of from 250° C. to 300° C. The mixture of air and steam admitted through the nozzle $t$ to the decarbonizing zone $c$ is in such proportions that the air instead of being saturated with water vapor at a temperature of about 84° C., is saturated at a temperature of from 90° C. to 92° C., according to the nature of the sludge. The decarbonization takes place at a temperature of from 600° C. to 800° C., some of the hot gases withdrawn from the decarbonizing zone being passed by a pipe $r$ to a heater $s$, wherein the blast of air and steam admitted to the decarbonizing zone $c$ is preheated. Finally, the treated material is discharged through suitable means at $u$. This degreasing operation is itself advantageously effected in a series of steps using steam of a gradually increased temperature and while the steam itself effects hydrolysis of the glycerids it may under certain circumstances be convenient to effect hydrolysis before subjecting the material to distillation. Instead of degreasing the material before gasification it may, however, be gasified or decarbonized directly and the fatty matters recovered with other by-products from the gas, any soaps tending to be formed from the fatty matter and ammonia compounds being decomposed by the absorbing acid.

The gasification temperature most suitable is in the neighborhood of bright red heat (600°–800° C. for a particular sample studied) the quality and amount of the gas depending upon the amount of air used. The greater the quantity of air the larger the quantity of gas and the lower the calorific value, but at the same time the external heat to be added becomes less. This make-up heat may be added through the walls of the gasifier but preferably by superheating the blast, this superheating heat, as also that of the steam for other operations, being preferably obtained by heat recuperation in the process itself. The reduction of the oxygen content of the blast may, if desired, be effected by adding inert gases such as products of combustion to the blast although this course tends somewhat to inefficient nitrogen recovery. The gases evolved in this stage of the process can be treated in the customary way for recovery of the by-products such as ammonia, pyridin and other bases.

An advantage of the process just described consists of its permitting any desired rapidity of removal of the nitrogen and other products from the material and even of interrupting decarbonization at any desired stage.

Having now described our invention what we claim as new and desire to secure by Letters Patent is:—

1. A process for treating sewage sludge, consisting in subjecting it to decarbonization by partial combustion with a limited amount of air in the presence of steam, reducing the proportion of air to steam to such an extent that the heat of combustion is insufficient to maintain the decarbonization, and supplying such additional heat from an external source as will maintain the reaction without resulting in fusion of the contained ash.

2. A process for treating sewage sludge, consisting in subjecting the material to a distilling operation to remove fatty matters, then decarbonizing the material by partial combustion with a limited supply of air in the presence of steam, reducing the proportion of air to steam to such an extent that the heat of combustion is insufficient to maintain the reaction, and adding from an external source such additional heat as is necessary to render combustion continuous at a temperature below the fusion point of the ash present in the sludge.

3. A process for treating sewage sludge, consisting in subjecting the material to a distilling operation to remove fatty matters, then decarbonizing the material by partial combustion with a limited supply of air in the presence of steam, reducing the proportion of air to steam to such an extent that the heat of combustion is insufficient to maintain the reaction, and in supplying such additional heat as is required to render low temperature combustion continuous by superheating the mixture of air and steam.

4. A process for treating sewage sludge, consisting in drying the sludge, subjecting it to a distilling operation to remove fatty matters, decarbonizing it by a partial combustion with a limited amount of air in the presence of steam, reducing the proportion of such air to steam to such an extent that the heat of combustion is insufficient to maintain the reaction, utilizing the water vapor generated during drying to assist the distilling operation, and utilizing gases produced during the decarbonization to preheat the air and steam used in connection therewith.

5. A process for the treatment of sewage sludge, consisting in drying the sludge, removing fatty matters therefrom by steam superheated to a temperature of from 250° C. to 300° C., decarbonizing the residue at a temperature of from 600° C. to 800° C., by partial combustion with a limited supply of air in the presence of steam, reducing the proportion of air to steam that the heat of combustion is insufficient to maintain decarbonization, and supplying from an external source the additional heat thus rendered necessary.

6. A process for the treatment of sewage sludge, consisting in drying the sludge, removing fatty matters therefrom by steam superheated to a temperature of from 250° C. to 300° C., decarbonizing the residue at a temperature of from 600° C. to 800° C., by partial combustion with air in the presence of steam in such proportion that the air is saturated at a temperature of from 90° C. to 92° C., and supplying from an external source additional heat necessary to maintain decarbonization.

In testimony whereof we have signed our names to this specification in the presence of two subscribing witnesses.

NILS TESTRUP.
T. RIGBY.
G. W. ANDREW.

Witnesses to the signature of Nils Testrup:
R. A. OUTHWAITE,
E. C. WALKER.

Witnesses to the signatures of Thomas Rigby and G. W. Andrew:
BERTRAM H. MATTHEWS,
H. DUNWORTH.